US012236882B2

(12) United States Patent
Mao et al.

(10) Patent No.: US 12,236,882 B2
(45) Date of Patent: Feb. 25, 2025

(54) DISPLAY PANEL AND DISPLAY METHOD THEREOF, AND DISPLAY APPARATUS

(71) Applicants: Hefei BOE Joint Technology Co., Ltd., Anhui (CN); BOE Technology Group Co., Ltd., Beijing (CN)

(72) Inventors: Jian Mao, Beijing (CN); Song Meng, Beijing (CN); Xiaolong Wei, Beijing (CN); Miao Liu, Beijing (CN); Cheng Xu, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/693,528

(22) PCT Filed: Aug. 2, 2023

(86) PCT No.: PCT/CN2023/110785

§ 371 (c)(1),
(2) Date: Mar. 20, 2024

(87) PCT Pub. No.: WO2024/037344

PCT Pub. Date: Feb. 22, 2024

(65) Prior Publication Data

US 2024/0395205 A1 Nov. 28, 2024

(30) Foreign Application Priority Data

Aug. 16, 2022 (CN) ......................... 202210980572.5

(51) Int. Cl.

*G09G 3/3233* (2016.01)
*G09G 3/00* (2006.01)

(52) U.S. Cl.

CPC ........... *G09G 3/3233* (2013.01); *G09G 3/006* (2013.01); *G09G 2310/08* (2013.01); *G09G 2330/12* (2013.01)

(58) Field of Classification Search

None
See application file for complete search history.

(56) References Cited

U.S. PATENT DOCUMENTS

2013/0076769 A1* 3/2013 Park .................... G09G 3/3648 345/547
2019/0051239 A1 2/2019 Park et al.
(Continued)

FOREIGN PATENT DOCUMENTS

CN 109119026 A 1/2019
CN 109658856 A 4/2019
(Continued)

OTHER PUBLICATIONS

International Search Report for PCT/CN2023/110785 Mailed Nov. 28, 2023.

*Primary Examiner* — Krishna P Neupane
(74) *Attorney, Agent, or Firm* — Ling Wu; Stephen Yang; Ling and Yang Intellectual Property

(57) ABSTRACT

The display panel includes a plurality of pixel units and a sense compensation circuit; and a pixel unit includes a plurality of sub-pixels; a sub-pixel includes a pixel drive circuit and an element to be driven; the display panel further includes: a detection unit and a compensator; the sense compensation circuit is configured to sense the electrical characteristics of said element at a non-active time; the detection unit is configured to detect whether dynamic and static attributes of a picture displayed in a previous preset time period are changed, and send a first notification to the compensator when the dynamic and static attributes are changed; the compensator is configured to receive the first
(Continued)

notification and not, according to the sense result of the sense compensation circuit in the previous preset time period, compensate for a picture displayed in a next preset time period.

15 Claims, 7 Drawing Sheets

(56) References Cited

U.S. PATENT DOCUMENTS

| | | | | |
|---|---|---|---|---|
| 2019/0295462 | A1* | 9/2019 | Song | G09G 3/2096 |
| 2022/0122545 | A1* | 4/2022 | Hong | H10K 50/11 |
| 2022/0130332 | A1* | 4/2022 | Ok | G09G 3/3233 |

FOREIGN PATENT DOCUMENTS

| | | | |
|---|---|---|---|
| CN | 111105764 | A | 5/2020 |
| CN | 115527492 | A | 12/2022 |
| KR | 20170006350 | A | 1/2017 |
| KR | 20170064176 | A | 6/2017 |
| KR | 20180013433 | A | 2/2018 |
| KR | 20220090188 | A | 6/2022 |
| WO | 2017028518 | A1 | 2/2017 |

* cited by examiner

DISPLAY PANEL AND DISPLAY METHOD THEREOF, AND DISPLAY APPARATUS

CROSS-REFERENCE TO RELATED APPLICATIONS

The present application is a U.S. National Phase Entry of International Application PCT/CN2023/110785 having an international filing date of Aug. 2, 2023, which claims priority to Chinese Patent Application No. 202210980572.5 filed to the CNIPA on Aug. 16, 2022 and entitled “Display Panel and Display Method Thereof, and Display Apparatus”, and the contents disclosed in the above-mentioned applications are hereby incorporated as a part of this application.

TECHNICAL FIELD

Embodiments of the present disclosure relate to, but are not limited to, the field of display technologies, and particularly to a display panel and a display method thereof, and a display apparatus.

BACKGROUND

An Organic Light Emitting Diode (OLED) is an active light emitting display device, which has advantages such as luminescence, ultra-thinness, a wide angle of view, a high brightness, a high contrast, a relatively low power consumption, an extreme high response speed, or the like. Depending upon different driving modes, OLEDs may be divided into two types, i.e., a Passive Matrix (PM) type and an Active Matrix (AM) type. An AMOLED is a current driven device in which an independent Thin Film Transistor (TFT) is used for controlling each sub-pixel, and each sub-pixel may be continuously and independently driven to emit light.

SUMMARY

The following is a summary of subject matter described herein in detail. The summary is not intended to limit the scope of protection of the claims.

An embodiment of the present disclosure provides a display panel, including a plurality of pixel units and a sense compensation circuit, the at least one pixel unit includes a plurality of sub-pixels, at least one sub-pixel includes a pixel drive circuit and an element to be driven, the display panel further includes: a detection unit and a compensator;

The pixel drive circuit is configured to drive the element to be driven to emit light in active time;

- the sense compensation circuit is configured to sense electrical characteristics of the element to be driven in non-active time;
- the detection unit is configured to detect whether dynamic and static attributes of a picture displayed by the display panel in a previous preset time period change, a preset time period includes a active time and a non-active time, and when the dynamic and static attributes of the picture displayed by the display panel in the previous preset time period change, a first notification is sent to the compensator;
- the compensator is configured to receive the first notification and perform at least one of the following operations: the picture displayed in a next preset time period being not compensated according to a sense result of the sense compensation circuit in the previous preset time period, and the sense function of the sense compensation circuit in the next preset time period being turned off.

An embodiment of the present disclosure also provides a display apparatus, including: the display panel according to any embodiment of the present disclosure.

An embodiment of the present disclosure provides a display panel, including a plurality of pixel units and a sense compensation circuit, at least one pixel unit includes a plurality of sub-pixels, at least one sub-pixel includes a pixel drive circuit and an element to be driven, the display panel further includes: a detection unit and a compensator, the display method includes:

- the detection unit detects whether dynamic and static attributes of a picture displayed by the display panel in a previous preset time period change, a preset time period includes an active time and a non-active time, and when the dynamic and static attributes of the picture displayed by the display panel in the previous preset time period change, a first notification is sent to the compensator;
- when the compensator receives the first notification, the compensator performs at least one of the following operations: the picture displayed in a next preset time period being not compensated according to a sense result of the sense compensation circuit in the previous preset time period, and the sense function of the sense compensation circuit in the next preset time period being turned off.

Other aspects may be comprehended upon reading and understanding drawings and detailed description.

BRIEF DESCRIPTION OF DRAWINGS

Accompany drawings are used to provide further understanding of technical solution of the present disclosure, and form a part of the description. The accompany drawings and embodiments of the present disclosure are adopted to explain the technical solution of the present disclosure, and do not form limitations on the technical solution of the present disclosure.

DETAILED DESCRIPTION

Figure 1:
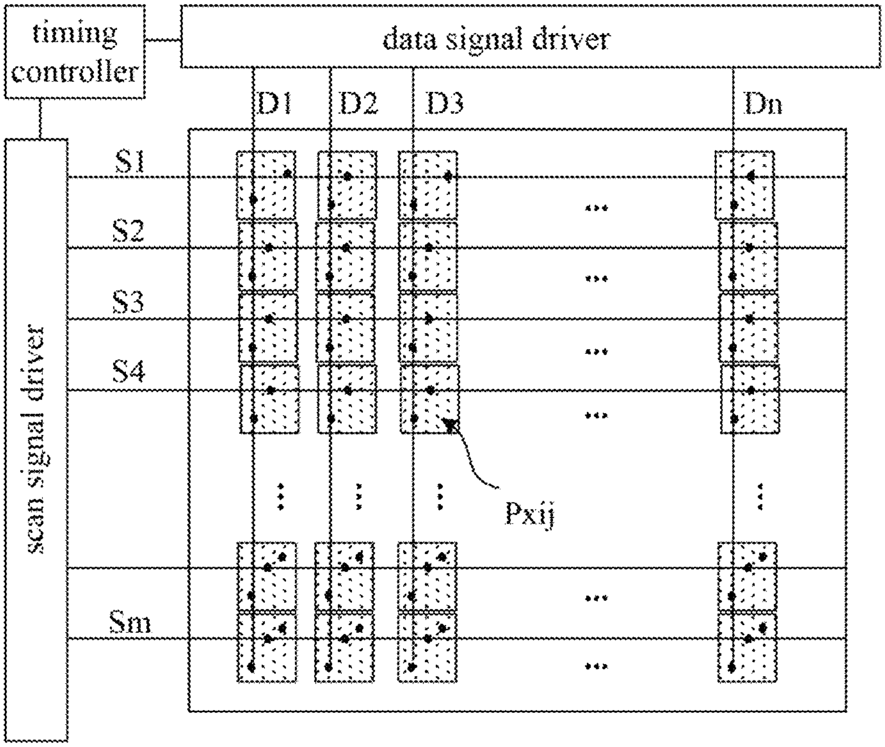
FIG. 1 is a schematic diagram of a structure of a display apparatus.

To make the objectives, technical solutions, and advantages of the present disclosure clearer, the embodiments of the present disclosure will be described in detail below in with reference to the accompany drawings. Implementation modes may be implemented in multiple different forms. Those of ordinary skills in the art can easily understand such a fact that implementation modes and contents may be transformed into various forms without departing from the purpose and scope of the present disclosure. Therefore, the present disclosure should not be explained as being limited to the contents recorded in the following implementations only. The embodiments and features in the embodiments of the present disclosure may be randomly combined with each other if there is no conflicts.

Scales of the drawings in the present disclosure may be used as a reference in actual processes, but are not limited thereto. For example, a width-length ratio of a channel, a thickness and spacing of each film layer, and a width and spacing of each signal line may be adjusted according to actual needs. A quantity of pixels in a display panel and a quantity of sub-pixels in each pixel are not limited to numbers shown in the drawings. The drawings described in the present disclosure are structural schematic diagrams only, and one mode of the present disclosure is not limited to shapes, numerical values, or the like shown in the drawings.

Ordinal numerals "first", "second", "third", etc., in the specification are set not to form limits in numbers but only to avoid confusion between composition elements.

In the specification, for convenience, expressions "central", "above", "below", "front", "back", "vertical", "horizontal", "top", "bottom", "inside", "outside", etc., indicating directional or positional relationships are used to illustrate positional relationships between the composition elements, not to indicate or imply that involved devices or elements are required to have specific orientations and be structured and operated with the specific orientations but only to easily and simply describe the present specification, and thus should not be understood as limitations on the present disclosure. The positional relationships between the composition elements may be changed as appropriate according to a direction according to which each composition element is described. Therefore, appropriate replacements based on situations are allowed, which is not limited to the expressions in the specification.

In the specification, unless otherwise specified and defined, terms "mounting", "mutual connection", and "connection" should be understood in a broad sense. For example, a connection may be fixed connection, or detachable connection, or integral connection; it may be mechanical connection or electrical connection; it may be direct connection, or indirect connection through an intermediate, or internal communication between two elements. Those of ordinary skills in the art can understand specific meanings of the above terms in the present disclosure according to specific situations.

In the specification, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that in the specification, the channel region refers to a region through which a current mainly flows.

In the specification, a first electrode may be a drain electrode, and a second electrode may be a source electrode. Or, the first electrode may be a source electrode, and the second electrode may be a drain electrode. In cases that transistors with opposite polarities are used, or a current direction changes during operation of a circuit, or the like, functions of the "source electrode" and the "drain electrode" are sometimes interchangeable. Therefore, the "source electrode" and the "drain electrode", as well as the "source terminal" and the "drain terminal", are interchangeable in the specification.

In the specification, "electrical connection" includes connection of composition elements through an element with a certain electrical action. An "element with a certain electrical action" is not particularly limited as long as electric signals between the connected composition elements may be sent and received. Examples of the "element with the certain electrical action" not only include an electrode and a line, but also include a switch element such as a transistor, a resistor, an inductor, a capacitor, another element with various functions, etc.

FIG. 1 is a schematic diagram of a structure of a display apparatus. As shown in FIG. 1, the display apparatus may include a timing controller, a data signal driver, a scan signal driver, and a pixel array. The timing controller is connected with the data signal driver and the scan signal driver respectively, the data signal driver is connected with multiple data signal lines (D1 to Dn) respectively, and the scan signal driver is connected with multiple scan signal lines (S1 to Sm) respectively. The pixel array may include multiple sub-pixels Pxij, wherein i and j may be natural numbers. At least one sub-pixel Pxij may include a circuit unit and a light emitting device connected with the circuit unit, wherein the circuit unit may include at least one scan signal line, at least one data signal line, and a pixel drive circuit. In an exemplary implementation mode, the timing controller may provide a gray scale value and a control signal suitable for a specification of the data signal driver to the data signal driver, and provide a clock signal, a scan start signal, and etc. suitable for a specification of the scan signal driver to the scan signal driver. The data signal driver may generate data voltages to be provided to data signal lines D1, D2, D3, . . . , and Dn using the gray scale value and the control signal received from the timing controller. For example, the data signal driver may sample the gray scale value using a clock signal and apply a data voltage corresponding to the gray scale value to the data signal lines D1 to Dn by taking a pixel row as a unit, wherein n may be a natural number. The scan signal driver may generate scan signals to be provided to scan signal lines S1, S2, S3, . . . , and Sm by receiving a clock signal, a scan start signal, and the like from the timing controller. For example, the scan signal driver may sequentially provide scan signals with turning-on-level pulses to the scan signal lines S1 to Sm. For example, the scan signal driver may be constructed in a form of a shift register, and generate the scan signals in a mode of sequentially transmitting the scan start signal provided in a form of turning-on-level pulses to a next-stage circuit under controlling of the clock signal, wherein m may be a natural number.

Figure 2:
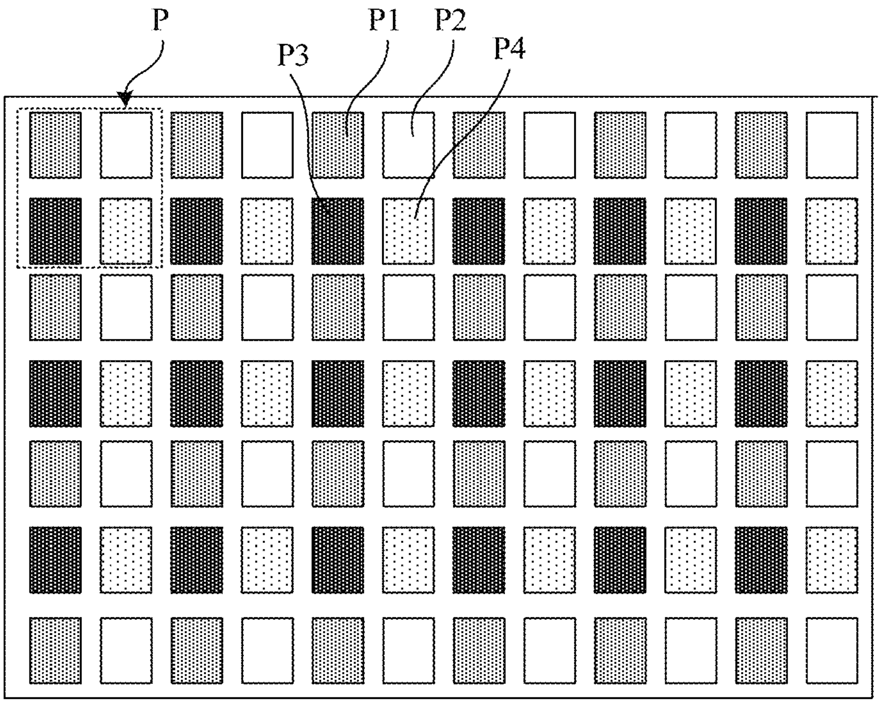
FIG. 2 is a schematic diagram of a planar structure of a display panel.

FIG. 2 is a schematic diagram of a planar structure of a display panel. As shown in FIG. 2, the display panel may include multiple pixel units P arranged in a matrix, at least one of the multiple pixel units P includes a first sub-pixel P1 emitting light of a first color, a second sub-pixel P2 emitting light of a second color, and a third sub-pixel P3 emitting light of a third color light, and a fourth sub-pixel P4 emitting light of a fourth color. The four sub-pixels may each include a circuit unit and a light emitting device, wherein the circuit unit may include a scan signal line, a data signal line, and a pixel drive circuit. The pixel drive circuit is respectively electrically connected with the scan signal line and the data signal line, and the pixel drive circuit is configured to receive a data voltage transmitted by the data signal line and output a corresponding current to the light emitting device, under control of the scan signal line. The light emitting device in each sub-pixel is connected to a pixel drive circuit of the sub-pixel where the light emitting device is located, and is configured to emit light with a corresponding brightness in response to a current output by the pixel drive circuit of the sub-pixel where the light emitting device is located.

In an exemplary implementation mode, the first sub-pixel P1 may be a red sub-pixel (R) emitting red light, the second sub-pixel P2 may be a green sub-pixel (G) emitting green light, the third sub-pixel P3 may be a white sub-pixel (W) emitting white light, and the fourth sub-pixel P4 may be a blue sub-pixel (B) emitting blue light.

In some exemplary embodiments, the sub-pixel may have a shape of a rectangle, a rhombus, a pentagon, or a hexagon. In an exemplary implementation mode, the four sub-pixels may be arranged in a horizontal side-by-side manner to form an RWBG pixel arrangement. In another exemplary implementation mode, the four sub-pixels may be arranged in a square, diamond, vertical side-by-side manner, or the like, which is not limited here in the present disclosure.

In an exemplary embodiment, multiple sub-pixels sequentially arranged in the horizontal direction are referred to as a pixel row, and multiple sub-pixels sequentially arranged in the vertical direction are referred to as a pixel column; and the multiple pixel rows and the multiple pixel columns together form a pixel array arranged in an array.

Figure 3:
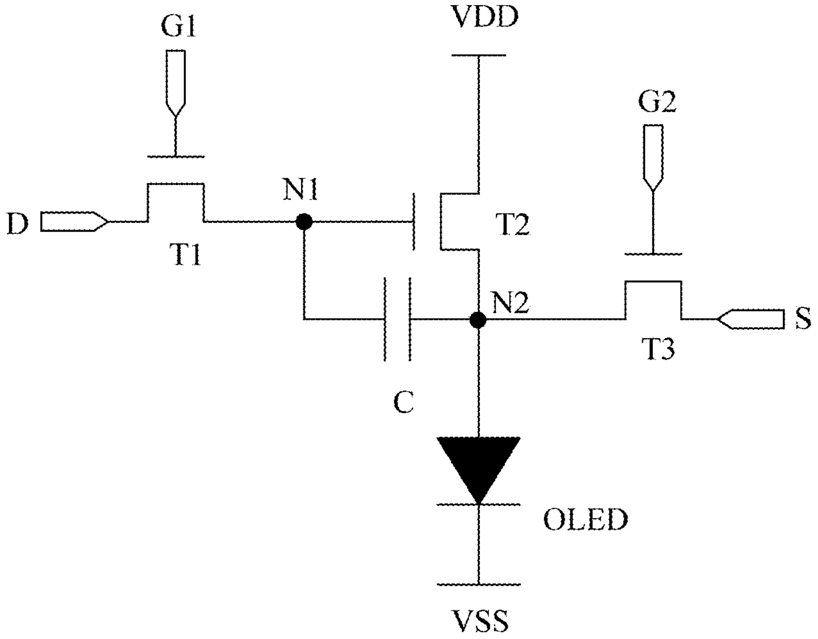
FIG. 3 is a schematic diagram of an equivalent circuit of a pixel drive circuit.

In an exemplary implementation mode, the pixel drive circuit may have a structure of 3T1C, 4T1C, 5T1C, 5T2C, 6T1C, 7T1C, or 8T1C. FIG. 3 is a schematic diagram of an equivalent circuit of a pixel drive circuit. As shown in FIG. 3, the pixel drive circuit has a 3T1C structure, and may include three transistors (a first transistor T1, a second transistor T2, and a third transistor T3), one storage capacitor C, and six signal lines (a data signal line D, a first scan signal line G1, a second scan signal line G2, a compensation signal line S, a first power supply line VDD, and a second power supply line VSS).

In an exemplary implementation mode, the first transistor T1 is a switching transistor, the second transistor T2 is a drive transistor, and the third transistor T3 is a compensation transistor. A first electrode of the storage capacitor C is coupled with a control electrode of the second transistor T2, a second electrode of the storage capacitor C is coupled with a second electrode of the second transistor T2, and the storage capacitor C is configured to store a potential of the control electrode of the second transistor T2. A control electrode of the first transistor T1 is coupled to the first scan signal line G1, a first electrode of the first transistor T1 is coupled to the data signal line D, a second electrode of the first transistor T1 is coupled to the control electrode of the second transistor T2. The first transistor T1 is configured to receive a data signal transmitted by the data signal line D under control of the first scan signal line G1, so that the control electrode of the second transistor T2 receives the data signal. The control electrode of the second transistor T2 is coupled to the second electrode of the first transistor T1, a first electrode of the second transistor T2 is coupled to the first power supply line VDD, the second electrode of the second transistor T2 is coupled to a first electrode (anode) of a light emitting device, and the second transistor T2 is configured to generate a corresponding current at the second electrode under control of the data signal received by the control electrode of the second transistor. A control electrode of the third transistor T3 is coupled to the second scan signal line G2, a first electrode of the third transistor T3 is coupled to the compensation signal line S, a second electrode of the third transistor T3 is coupled to the second electrode of the second transistor T2. The third transistor T3 is configured to extract a threshold voltage Vth and a mobility rate of the second transistor T2 in response to compensation timing, so as to compensate the threshold voltage Vth. A second electrode (cathode) of the light emitting device is connected with the second power supply line VSS.

In an exemplary implementation mode, the light emitting device may be an OLED, including a first electrode (anode), an organic emitting layer, and a second electrode (cathode) that are stacked. The first electrode of the OLED is coupled to the second electrode of the second transistor T2, the second electrode of the OLED is coupled to the second power supply line VSS, and the OLED is configured to emit light with corresponding brightness in response to the current of the second electrode of the second transistor T2.

In an exemplary implementation mode, a signal of the first power supply line VDD is a high-level signal continuously provided, and a signal of the second power supply line VSS is a low-level signal. The first transistor T1 to the third transistor T3 may be P-type transistors or may be N-type transistors. Use of a same type of transistors in a pixel drive circuit may simplify a process flow, reduce a process difficulty of a display panel, and improve a product yield.

In an exemplary implementation mode, for the first transistor T1 to the third transistors T3, low temperature poly silicon thin film transistors may be adopted, oxide thin film transistors may be adopted, or a low temperature poly silicon thin film transistor and an oxide thin film transistor may be adopted. An active layer of a low temperature poly silicon thin film transistor is made of Low Temperature Poly Silicon (LTPS for short), and an active layer of an oxide thin film transistor is made of an oxide. The low temperature poly silicon thin film transistor has advantages of a high mobility, fast charging, and the like. The oxide thin film transistor has advantages of a low leakage current and the like. In an exemplary implementation mode, a low temperature poly silicon thin film transistor and an oxide thin film transistor may be integrated on one display panel to form a Low Temperature Polycrystalline Oxide (LTPO for short) display panel, so that advantages of the two may be utilized, high Pixel Per Inch (PPI for short) and low-frequency drive may be achieved, power consumption may be reduced, and display quality may be improved. In an exemplary implementation mode, the light emitting device may be an Organic Light Emitting Diode (OLED), including a first electrode (anode), an organic emitting layer, and a second electrode (cathode) that are stacked.

Time of each frame of an OLED display device is divided into active display time (active time) and blank time. In the active time, the OLED display device performs normal data output display by using a pixel drive circuit, and in the blank time, the OLED display device performs external real time sense compensation (real time sense) by using a sense compensation circuit. The OLED display device compensates in real time in the blank time of each frame, senses a change of TFT characteristics of a panel device, and then improves quality of a displayed picture through external compensation.

Figure 4:
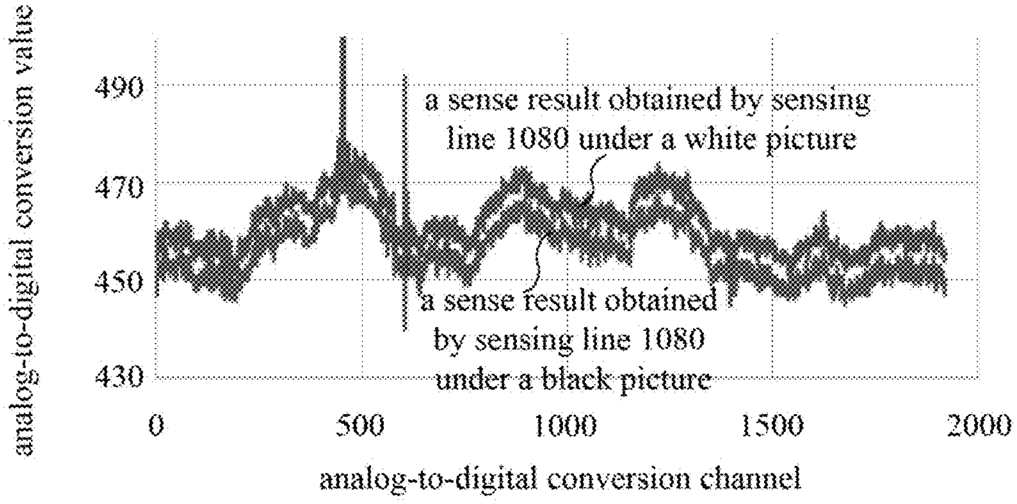
FIG. 4 is a schematic diagram of differences of sense results obtained by sensing line 1080 of the display panel under black and white pictures.
Figure 5:
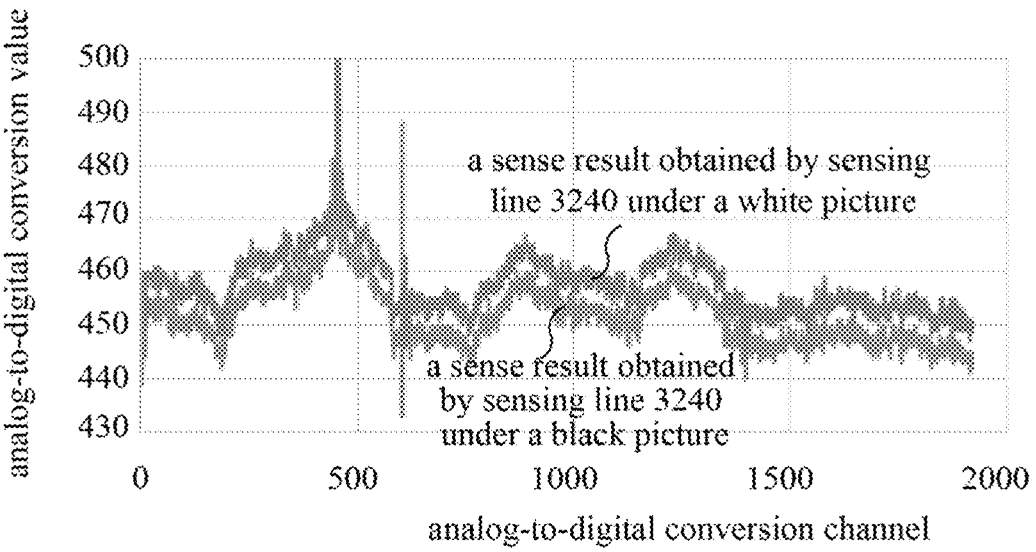
FIG. 5 is a schematic diagram of differences of sense results obtained by sensing line 3240 of the display panel under black and white pictures.

FIG. 4 is a schematic diagram of differences of sense results obtained by sensing line 1080 of the display panel under the black and white pictures, and FIG. 5 is a schematic diagram of differences of sense results obtained by sensing line 3240 of the display panel under the black and white pictures, wherein the horizontal coordinate "analog-to-digital conversion channel" indicates the quantity of columns of the display panel, and the vertical ordinate "analog-to-digital conversion value" indicates the sensed voltage digital quantity. In an exemplary embodiment, the analog quantity corresponding to the voltage digital quantity x may be x/1023*16.5V. As shown in FIGS. 4 and 5, the sense results of the same line of OLED panel are quite different under the pictures in different colors and different gray scales, especially when the picture changes dramatically. At this time, the voltage coupling effect caused by the dramatic change of the picture will cause the voltage fluctuation on the compensation signal line S in the panel, and the compensation data generated by real time sense will make the compensated picture produce visible lateral texture.

Figure 6:
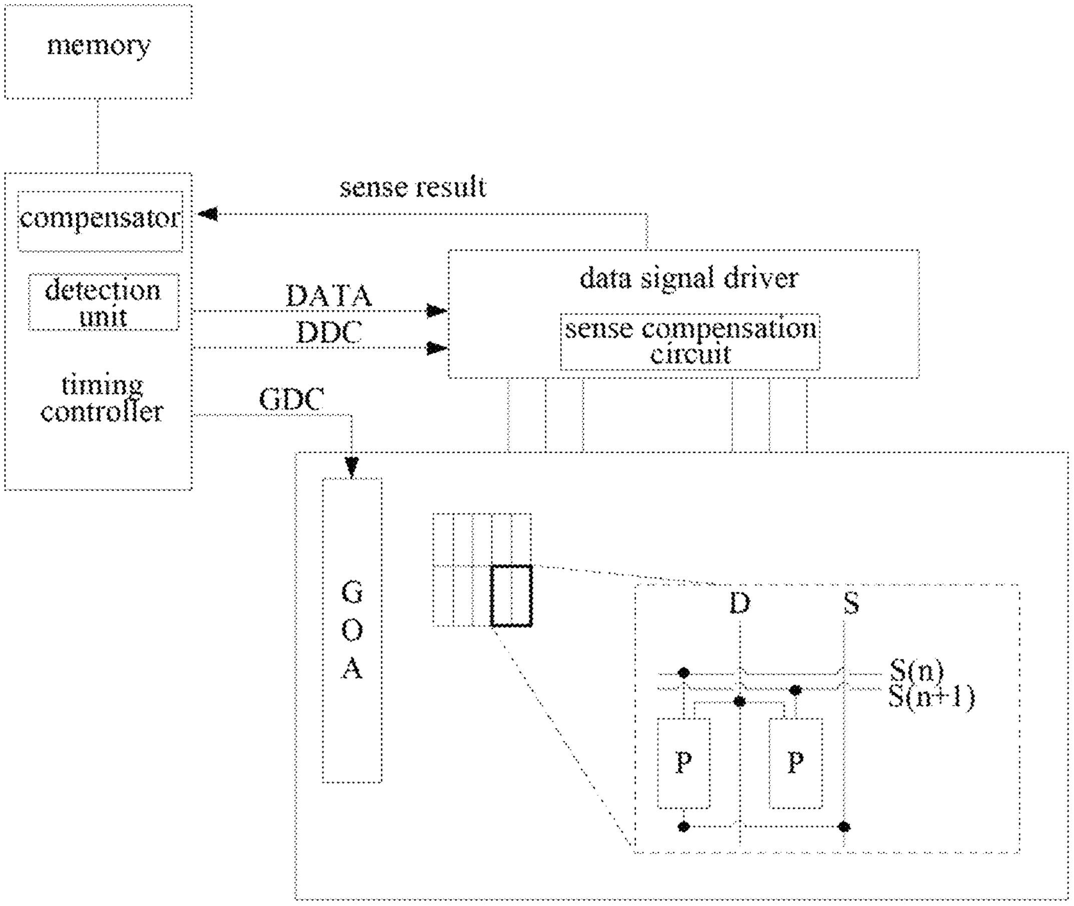
FIG. 6 is a schematic diagram of a structure of a display panel according to an exemplary embodiment of the present disclosure.

As shown in FIG. 6, an embodiment of the present disclosure provides a display panel including a plurality of pixel units P and a sense compensation circuit, at least one pixel unit P includes a plurality of sub-pixels, at least one sub-pixel includes a pixel drive circuit (not shown in the figure) and an element to be driven (not shown in the figure), the display panel further includes: a detection unit and a compensator, wherein:

the pixel drive circuit is configured to drive the element to be driven to emit light during an active time.

the sense compensation circuit is configured to sense electrical characteristics of the element to be driven during a non-active time;

the detection unit is configured to detect whether dynamic and static attributes of a picture displayed in a previous preset time period change, and when the dynamic and static attributes of the picture displayed in the previous preset time period change, send a first notification to the compensator;

the compensator is configured to, when receiving the first notification, not compensate the picture displayed in a next preset time period according to a sense result of the sense compensation circuit in the previous preset time period, and/or to turn off the sense function of the sense compensation circuit in the next preset time period, wherein a preset time period includes an active time and a non-active time.

The display panel provided by the embodiment of the present disclosure detects whether the dynamic and static attributes of a picture displayed in a previous preset time period change during a display process; if the dynamic and static attributes do not change, real time sense compensation is performed; otherwise, the picture displayed in a next preset time period is not compensated according to a sense result of the sense compensation circuit in the previous preset time period; and/or, the sense function of the sense compensation circuit in the next preset time period is turned off to maintain the accuracy of the real time sense compensation data, which can effectively shield a phenomenon that lateral textures appear on the picture displayed after compensation caused by the change of the dynamic and static attributes of the picture.

Figure 7:
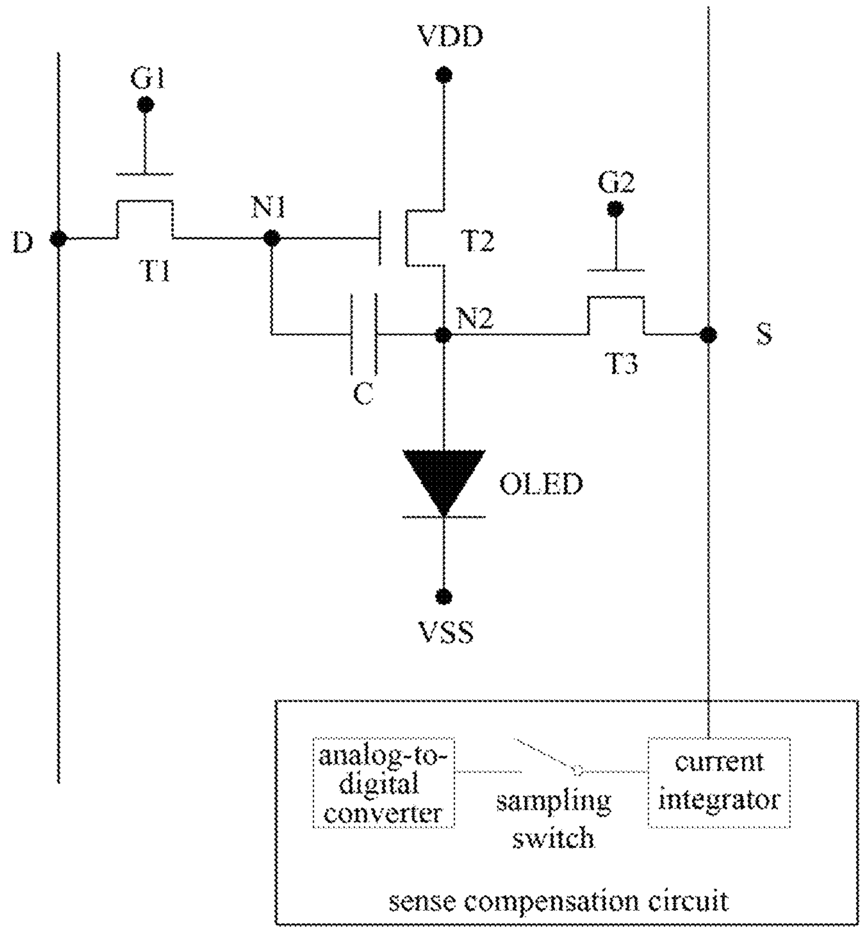
FIG. 7 is a schematic diagram of a connection relationship between a pixel drive circuit and a sense compensation circuit according to an exemplary embodiment of the present disclosure.

FIG. 7 is a schematic diagram of a connection relationship between a pixel drive circuit and a sense compensation circuit according to an exemplary embodiment of the present disclosure. The pixel drive circuit in FIG. 7 is of a 3T1C structure and includes three transistors (a first transistor T1, a second transistor T2, and a third transistor T3) and one storage capacitor C, however, the embodiment of the present disclosure is not limited thereto, and the pixel drive circuit may also include other numbers of transistors and storage capacitors. The pixel drive circuit is configured to receive a data voltage transmitted by a data signal line and output a corresponding current to an element to be driven under control of a scan signal line.

In some exemplary implementation modes, as shown in FIG. 7, the sense compensation circuit is connected with a compensation signal line S for acquiring an amount of charge flowing through the element to be driven within preset sense time (i.e., blank time), so that an external compensator calculates a compensation gain value of the element to be driven based on the acquired amount of charge.

In some exemplary embodiments, when a first notification is received, the compensator may be configured for any of the following conditions:

First, when receiving the first notification, the compensator does not turn off the sense function of the sense compensation circuit in the next preset time period, and the compensator does not compensate the picture displayed in the next preset time period;

Second, when receiving the first notification, the compensator does not turn off the sense function of the sense compensation circuit in the next preset time period, and compensates the picture displayed in the next preset time period according to a sense result of the sense compensation circuit in a time other than the previous preset time period;

Third, when receiving the first notification, the compensator turns off the sense function of the sense compensation circuit in the next preset time period, and the compensator does not compensate the picture displayed in the next preset time period;

Fourth, when receiving the first notification, the compensator turns off the sense function of the sense compensation circuit in the next preset time period, and compensates the picture displayed in the next preset time period according to a sense result of the sense compensation circuit in a time other than the previous preset time period.

In some exemplary embodiments, the sense result of the sense compensation circuit in a time other than the previous preset time period may be the sense result of the sense compensation circuit at least one of the following times: a startup time, a shutdown time, a user-specified time, a blank time outside the previous preset time period.

In the embodiment of the present disclosure, in a startup operation stage of the display apparatus, the detection unit may determine whether it is necessary to perform startup detection on electric compensation parameters of the display apparatus; when startup detection needs to be performed on the electric compensation parameters of the display apparatus, following startup operations are performed: performing startup detection on the electric compensation parameters of the display apparatus to obtain new values of the compensation parameters, and storing them in the memory.

In a shutdown operation stage of the display apparatus, the detection unit may determine whether it is necessary to perform shutdown detection on the electrical compensation parameters of the display apparatus; when it is necessary to perform shutdown detection on the electrical compensation parameters of the display apparatus, following shutdown operations are performed: performing shutdown detection on the electrical compensation parameters of the display apparatus to obtain updated values of the compensation parameters, and storing them in the memory.

During an operation of the display apparatus, the detection unit may also detect the electrical compensation parameters of the display apparatus according to sense time specified by a user, and obtain updated values of the compensation parameter, and store them in the memory.

In some exemplary implementation modes, the electrical compensation parameters include a threshold voltage and/or a mobility rate of a drive transistor of each pixel unit, and/or a threshold voltage of a light emitting element of each pixel unit.

In some exemplary embodiments, the compensator is further configured to compensate, when the first notification is not received, a picture displayed in a next preset time period according to a sense result of the sense compensation circuit in the previous preset time period.

Figure 8:
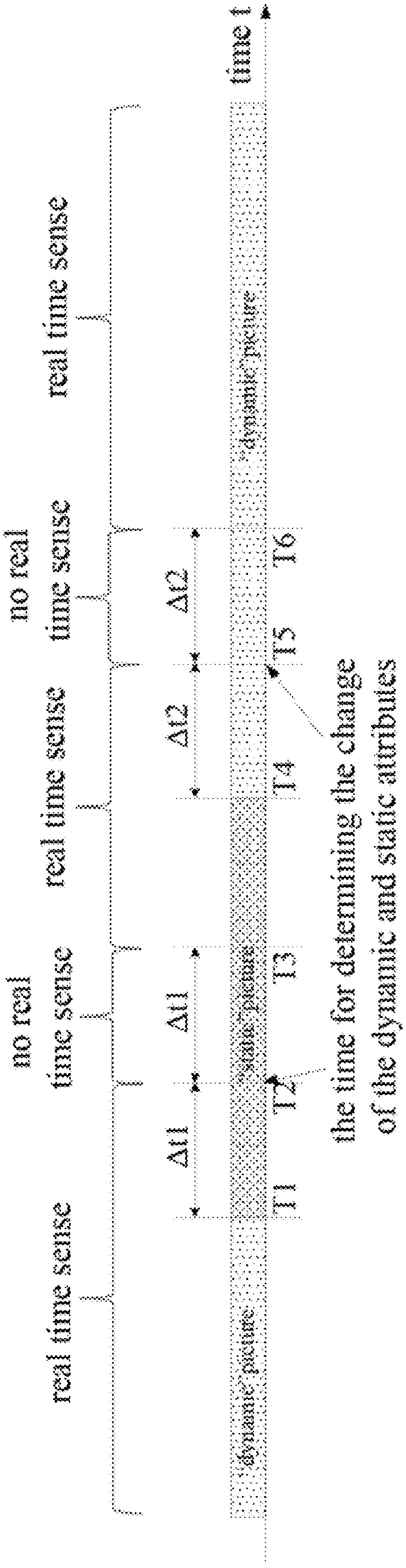
FIG. 8 is a display flowchart of a display panel according to an exemplary embodiment of the present disclosure.
Figure 9:
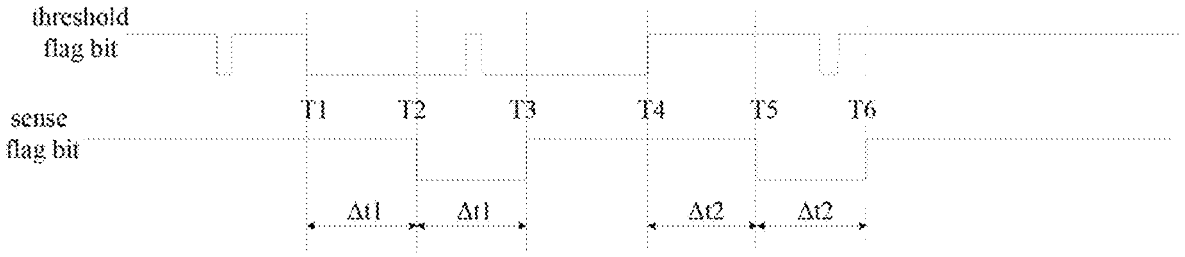
FIG. 9 is a schematic diagram showing changes of threshold flag bit and sense flag bit in the display flow corresponding to FIG. 8.

FIG. 8 is a display flowchart of a display panel of an exemplary embodiment of the present disclosure, and FIG. 9 is a schematic diagram showing changes of threshold flag bit (Threshold_flag) and sense flag bit (Sense_flag) in the display flow corresponding to FIG. 8. As shown in FIGS. 8 and 9, when the display panel is displayed, the dynamic and static attributes of each frame are determined according to whether the change amount of brightness of each frame relative to the brightness of the first picture (exemplarily, the first picture can be the picture in previous frame of each frame) is greater than a preset change amount threshold (that is, determine the size of the threshold flag bits), and then whether the dynamic and static attributes of the picture displayed in the previous preset time period change is determined. If not, the dynamic and static attributes of the picture displayed in a next preset time period are compensated according to a sense result of the sense compensation circuit in the previous preset time period, and in the next preset time period, real time sense continues to be performed (that is, the sense flag bit in the next preset time period is high level), and the compensation data is updated after the sense is completed. If the change occurs, the picture displayed in the next preset time period is not compensated or the picture displayed in the next preset time period is compensated according to the sense result of the sense compensation circuit at a time other than the previous preset time period, and the real time sense is not performed in the next preset time period or the real time sense is performed in the next preset time period, but the compensation data is not updated (that is, the sense flag bit in the next preset time period is low level). This may effectively prevent a problem of lateral fine stripes in a compensated displayed picture due to deviation of a real time sense result caused by a large brightness change difference between adjacent frames during a display process.

In the embodiment of the present disclosure, the threshold flag bit Threshold_flag is high, indicating that the change amount of the brightness of the current frame relative to the brightness of the first picture is greater than the preset change amount threshold, i.e. the current frame is a dynamic picture; conversely, the threshold flag bit Threshold_flag is low, indicating that the change amount of the brightness of the current frame relative to the brightness of the first picture is less than or equal to the preset change amount threshold, i.e. the current frame is a static picture.

The display method of the embodiment of the present disclosure determines whether the whole dynamic and static attributes of the picture displayed in a preset time period change according to whether the dynamic and static attributes of each frame displayed in the preset time period change, in order to enable the stable and reliable update of the data switched between the dynamic and static pictures. When the dynamic and static attributes of the picture displayed in the previous preset time period do not all change, it is determined that the dynamic and static attributes of the picture displayed in the next preset time period are the same as those of the picture displayed in the previous preset time period.

Exemplarily, when the picture displayed in a preset time period before the previous preset time period is a dynamic picture, whether the picture displayed in the previous preset time period is a static picture relative to the first picture is detected, and when the picture displayed in the previous preset time period is a static picture relative to the first picture, it is determined that the dynamic and static attributes of the picture displayed in the previous preset time period change; when one or more frames of the picture displayed in the previous preset time period are dynamic pictures relative to the first picture, it is determined that the dynamic and static attributes of the picture displayed in the previous preset time period do not change;

when the picture displayed in a preset time period before the previous preset time period is a static picture, whether the picture displayed in the previous preset time period is a dynamic picture relative to the first picture is detected, and when the picture displayed in the previous preset time period is a dynamic picture relative to the first picture, it is determined that the dynamic and static attributes of the picture displayed in the previous preset time period change; when one or more frames of the picture displayed in the previous preset time period are static pictures relative to the first picture, it is determined that the dynamic and static attributes of the picture displayed in the previous preset time period do not change.

Therefore, as shown in FIGS. 8 and 9, even before time T1, between time T2 and time T3, and between time T5 and time T6, ΔT time threshold flag bit Threshold_flag changes, however, due to ΔT time is short (lower than the preset time period), it is deemed that the dynamic and static attributes of the whole picture do not change before T1, between T2 and T3, and between T5 and T6.

In addition, although the actual dynamic and static attributes change at times T1 and T4, according to the display method of the embodiment of the present disclosure, in FIG. 8, it is determined that the time when the dynamic picture turns to the static picture is at time T2, and the time when the static picture turns to the dynamic picture is at time T5. This is because it is needed to detect whether the dynamic and static attributes of the picture displayed in a preset time period change, so as to determine the time when the dynamic and static attributes of the whole picture change, that is, the determination time is delayed by a preset time period from the actual occurrence time.

In some exemplary embodiments, the length of the preset time period is related to a refresh rate of the display panel, and the higher the refresh rate of the display panel, the longer the length of the preset time period. Exemplarily, the preset time period may be set to multiple frames or t seconds, wherein t is a real number greater than 0, for example, t may be 1. When the refresh rate is 120 Hz, the preset time period is assumed to be 1 second, in which time the preset time period includes 120 frames.

In some exemplary embodiments, the preset time period includes a Δt1 time interval and a Δt2 time interval; when the picture displayed in the previous preset time period is a dynamic picture, the preset time period is the Δt1 time interval; when the picture displayed in the previous preset time period is a static picture, the preset time period is the Δt2 time interval.

In some exemplary embodiments, the Δt1 time interval is longer than the Δt2 time interval. In order to enable the stable and reliable update of the data switched between the dynamic picture and the static picture, the Δt1 time interval and the Δt2 time interval can be obtained by experimental method.

In some exemplary embodiments, the detection unit determines the static and dynamic attributes of each frame according to whether the change amount of brightness data of each frame relative to the brightness data of a first picture is greater than a preset change amount threshold, wherein the first picture is an x-th frame before each frame or a preset reference picture, and x is a natural number greater than or equal to 1.

In some exemplary embodiments, the brightness data of each frame includes brightness data of each sub-pixel and brightness data of the whole picture, and the preset change amount threshold includes change amount thresholds of various sub-pixels and change amount threshold of the whole picture.

In the embodiment of the present disclosure, the detection unit can accumulate and sum the brightness data of all sub-pixels and the brightness data of various sub-pixels in the current picture displayed, the brightness data of all sub-pixels and the brightness data of various sub-pixels in the first picture, respectively, and determine the dynamic and static attributes of each frame according to whether the difference of each summation result is less than a preset change amount threshold.

Exemplarily, the sub-pixel of the preset color may be a sub-pixel of any color, such as a red sub-pixel, a green sub-pixel, a blue sub-pixel, or a white sub-pixel. When differences in summation results of brightness data of red sub-pixels, green sub-pixels, blue sub-pixels and white sub-pixels are all less than a preset change amount threshold, the frame is determined to be a static picture, and the change amount thresholds corresponding to red sub-pixels, green sub-pixels, blue sub-pixels and white sub-pixels may be the same or different.

In the embodiment of the present disclosure, the optimal threshold value is when the threshold value of the change amount is adjusted so that the lateral stripes generated by the real time sense of the display panel are obviously weakened without affecting the compensation effect of the real time sense. When the picture brightness of RGB video source changes greatly, the change amount threshold can be set higher; when the picture brightness of RGB video source changes little, the change amount threshold can be set lower.

When the change amount threshold is set to zero, that is, when the picture changes are detected, no sense is performed, or a sense result of a previous preset time period is not used, and the lateral stripes are completely eliminated at this time, but this is equivalent to turning off the real time compensation. When the change amount threshold is set to the maximum brightness of the full screen, the voltage coupling effect caused by the dramatic change of the picture cannot be eliminated, and the compensation effect is not ideal, and the lateral stripes generated by real time sense are serious.

Figure 10:
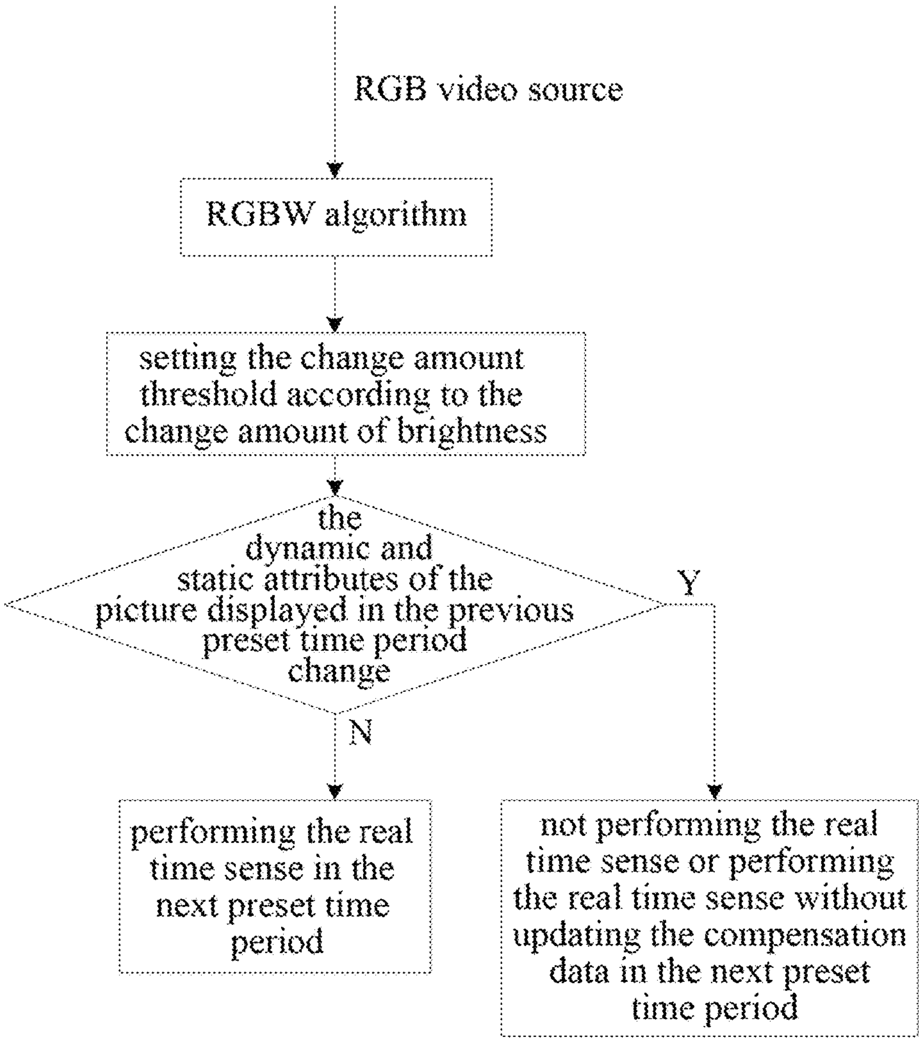
FIG. 10 is a display flowchart of another display panel according to an exemplary embodiment of the present disclosure.

FIG. 10 is a display flowchart of another display panel according to the embodiment of the present disclosure. As shown in FIG. 10, it is assumed that each pixel unit of the display panel includes one red sub-pixel that emits red light (R), one green sub-pixel that emits green light (G), one white sub-pixel (W) that emits white light, one blue sub-pixel that emits blue light (B). The detection unit converts the data of the RGB video source (exemplarily, the data of the RGB video source can be gray-scale data) into the brightness data of various sub-pixels of the RGBW by a RGBW algorithm, sets the change amount threshold corresponding to various sub-pixels and the whole picture according to the change amount of brightness of various sub-pixels of each frame, determines the dynamic and static attributes of each frame according to whether the change amount of the sum of the brightness data of various sub-pixels of each frame and the brightness data relative to various sub-pixels of the first picture is greater than the corresponding change amount threshold, and further determines whether the dynamic and static attributes of the picture displayed in the previous preset time period change. When the dynamic and static attributes of the picture displayed in the previous preset time period change, a real time sense is performed in a next preset time period, or the real time sense is performed in a next preset time period but the compensation data is not updated. When the dynamic and static attributes of the picture displayed in the previous preset time period do not change, the real time detection is performed in the next preset time period.

Exemplarily, a detection unit converting data of an RGB video source into brightness data of various sub-pixels of the RGBW by an RGBW algorithm includes: the detection unit converting gray scale data of the RGB video source into brightness data of various pixel unit RGB sub-pixels in a plurality of image frames, determining a minimum value of the brightness data of each pixel unit RGB sub-pixel, taking the determined minimum value as the brightness of W sub-pixel, and taking a difference of the brightness data of each pixel unit RGB sub-pixel minus the brightness of W sub-pixel as the brightness data of each pixel unit RGB sub-pixel.

Exemplarily, setting the change amount threshold corresponding to various sub-pixels and the whole picture according to the brightness change amount of various sub-pixels and all sub-pixels of each frame may include: setting the change amount threshold corresponding to the red sub-pixel as n1% of the brightness maximum value of the full-screen red sub-pixel, setting the change amount threshold corresponding to the green sub-pixel as n2% of the brightness maximum value of the full-screen green sub-pixel, setting the change amount threshold corresponding to the blue sub-pixel as n3% of the brightness maximum value of the full-screen blue sub-pixel, setting the change amount threshold corresponding to the white sub-pixel as n4% of the brightness maximum value of the full-screen white sub-pixel, and setting the change amount threshold corresponding to the whole picture as n5% of the brightness maximum value of the full-screen all sub-pixels, wherein each of n1, n2, n3, n4, and n5 is a real number that is greater than 0 but less than 100. Exemplarily, each of n1, n2, n3, n4, and n5 may be 50.

Exemplarily, determining the dynamic and static attributes of each frame according to whether the change amount of the sum of brightness data of various sub-pixels of each frame relative to the sum of brightness data of various sub-pixels of the first picture is greater than the corresponding change amount threshold may include: when the change amount of the sum of brightness data of red sub-pixels in a frame is less than or equal to the change amount threshold corresponding to the red sub-pixels, the change amount of the sum of brightness data of green sub-pixels is less than or equal to the change amount threshold corresponding to the green sub-pixels, the change amount of the sum of brightness data of blue sub-pixels is less than or equal to the change amount threshold corresponding to the blue sub-pixels, the change amount of the sum of brightness data of white sub-pixels is less than or equal to the change amount threshold corresponding to the white sub-pixels, the change amount of the sum of brightness data of all sub-pixels is less than or equal to the change amount threshold value corresponding to the whole picture, the picture in the frame is a static picture; conversely, when any of the following conditions is met: the change amount of the sum of brightness data of the red sub-pixels is greater than the change amount threshold value corresponding to the red sub-pixels, the change amount of the sum of brightness data of the green sub-pixels is greater than the change amount threshold value corresponding to the green sub-pixels, the change amount of the sum of brightness data of the blue sub-pixels is greater than the change amount threshold value corresponding to the blue sub-pixels, the change amount of the sum of brightness data of the white sub-pixels is greater than the change amount threshold value corresponding to the white sub-pixels, and the change amount of the sum of brightness data of all sub-pixels is greater than the change amount threshold value corresponding to the whole picture, the picture in the frame is a dynamic picture. In other exemplary embodiments, the dynamic and static attributes of each frame may also be determined only according to the change amount of the sum of brightness data of one or more sub-pixels, or the dynamic and static attributes of each frame may be determined only according to the change amount of the sum of brightness data of all sub-pixels.

Figure 11:
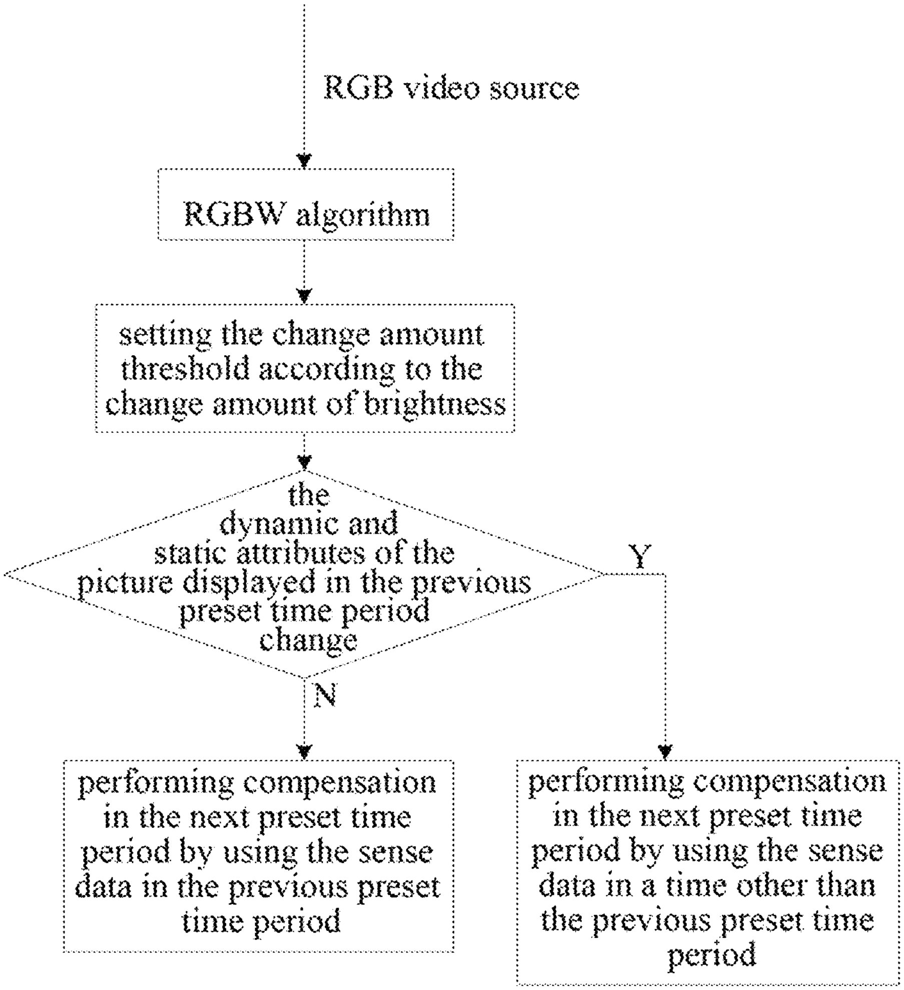
FIG. 11 is a display flowchart of yet another display panel according to an exemplary embodiment of the present disclosure.

FIG. 11 is a display flowchart of another display panel according to the embodiment of the present disclosure. As shown in FIG. 11, it is still assumed that each pixel unit of the display panel includes one red sub-pixel that emits red light (R), one green sub-pixel that emits green light (G), one white sub-pixel (W) that emits white light, one blue sub-pixel that emits blue light (B). The detection unit converts the data of the RGB video source into the brightness data of various sub-pixels of the RGBW by a RGBW algorithm, sets the change amount thresholds corresponding to various sub-pixels and the whole picture according to the brightness change amounts of various sub-pixels of each frame and all sub-pixels, determines the dynamic and static attributes of each frame according to whether the change amount of the sum of the brightness data of various sub-pixels of each frame relative to the sum of brightness data of various sub-pixels of the first picture is greater than the corresponding change amount threshold, further determines whether the dynamic and static attributes of the picture displayed in a previous preset time period change, and when the dynamic and static attributes of the picture displayed in the previous preset time period change, a sense data outside the previous preset time period is used for compensation; when the dynamic and static attributes of the picture displayed in the previous preset time period do not change, the sense data of the previous preset time period is used for compensation. In the embodiment of the present disclosure, when the dynamic and static attributes of the picture displayed in the previous preset time period change, it is deemed that the sense result in the previous preset time period is affected by the coupling voltage, that is, it is deemed that the sense result in the previous preset time period is unreliable, and the sense data in a time other than the previous preset time period is used for compensation when compensation is performed. When the dynamic and static attributes of the picture displayed in the previous preset time period do not change, the sense data in the previous preset time period is used for compensation.

The display method of the embodiment of the present disclosure determines whether the current picture is in a state of drastic change by calculating the brightness sum of each R, G, B and W component of each frame and comparing the change amount of the brightness sum of each component with the corresponding threshold value change amount respectively, and then determines whether to perform real time sense compensation to enable the effect of weakening lateral stripes.

The display method of the embodiment of the present disclosure is not only applicable to each pixel unit including one red sub-pixel that emits red light (R), one green sub-pixels that emits green light (G), one white sub-pixel (W) that emits white light, one blue sub-pixels that emits blue light (B), but also applicable to each pixel unit including other type and quantity of sub-pixels. For example, in other exemplary embodiments, each pixel unit may include one red sub-pixel that emits red light (R), one green sub-pixel that emits green light (G) and one blue sub-pixel that emits blue light (B). In still other exemplary embodiments, each pixel unit may include one red sub-pixel that emits red light (R), two green sub-pixels that emit green light (G) and one blue sub-pixel that emits blue light (B). At this point, the data of RGB video source can be processed as needed.

In some exemplary implementation modes, the display panel further includes a timing controller, a scan signal driver, and a data signal driver, wherein:

- the detection unit is further configured to send a second notification to the timing controller when the dynamic and static attributes of the picture displayed in the previous preset time period change;
- the timing controller is configured to output a clock signal and a scan start signal to the scan signal driver, and output a first data signal to the data signal driver, and is further configured to receive the second notification and adjust the timing of a clock signal, output to the scan signal driver, such that the sense compensation circuit will not perform a real time sense in the next preset time period.

The data signal driver is configured to receive a first data signal output by the timing controller, convert the first data signal into a data voltage for charging a pixel of a pixel unit and output the data voltage to a plurality of data lines.

The scan signal driver is configured to receive the clock signal and the scan start signal output by the timing controller, generate a scan signal according to the received clock signal and scan start signal, and output the scan signal to a plurality of scan signal lines.

In some exemplary embodiments, the scan signal driver may include a plurality of cascaded Gate On Array (GOA) circuits.

In some exemplary implementation modes, as shown in FIG. 7, the sense compensation circuit includes a current integrator, a sampling switch, and an analog-to-digital converter.

One end of the current integrator is connected with the compensation signal line S, and the other end of the current integrator is connected with a first path end of the sampling switch.

A second path end of the sampling switch is connected with a first end of the analog-to-digital converter, and a control end of the sampling switch receives a sampling signal.

A second end of the analog-to-digital converter is connected with the compensator.

In some exemplary implementation modes, the compensator compensates the currently displayed picture according to the sense result of the sense compensation circuit in the blank time of the currently displayed picture, including following operations.

According to an amount of charge flowing through the element to be driven within preset sense time (i.e., the blank time of the currently displayed picture), the compensator calculates a voltage difference value corresponding to the amount of charge.

The compensator obtains a compensation gain value (i.e. compensation data) of the element to be driven according to the calculated voltage difference value.

In some exemplary embodiments as shown in FIG. 6, the display panel further includes a memory configured to store sense results of the sense compensation circuit.

An embodiment of the present disclosure also provides a display method of a display panel, the display panel includes a plurality of pixel units and a sense compensation circuit, at least one pixel unit includes a plurality of sub-pixels, at least one sub-pixel includes a pixel drive circuit and an element to be driven, the display panel further includes: a detection unit and a compensator, the display method includes following operations:

- the detection unit detects whether the dynamic and static attributes of the picture displayed in the previous preset time period change, and when the dynamic and static attributes of the picture displayed in the previous preset time period change, sends a first notification to the compensator;
- when the compensator receives the first notification, the compensator does not compensate the pictures displayed in a next preset time period according to a sense result of the sense compensation circuit in the previous preset time period, and/or turns off the sense function of the sense compensation circuit in the next preset time period, wherein a preset time period includes an active time and a non-active time.

In some exemplary embodiments, the display method further includes following operations.

- when the dynamic and static attributes of the screen displayed in the previous preset time period change, the detection unit sends a second notification to the timing controller;
- the timing controller receives the second notification and adjusts the timing of the clock signal output to the scanning signal driver such that the sense compensation circuit will not perform real time sense in the next preset time period.

In other exemplary embodiments, the detection unit may not send the second notification to the timing controller when the dynamic and static attributes of the screen displayed in the previous preset time period change; the timing controller still output the previously set timing of clock signal to the scan signal driver, and the sense compensation circuit senses the electric characteristics of the element to be driven in the blank time in the next preset time period, and the compensator does not compensate the picture displayed in the next preset time period, or compensates the picture displayed in the next preset time period according to a sense result of the sense compensation circuit at a time other than the previous preset time period.

In some exemplary embodiments, the time outside the previous preset time period includes at least one of the following: a startup time, a shutdown time, a user-specified time, and a blank time outside the previous preset time period.

An exemplary embodiment of the present disclosure also provides a display apparatus which includes the display panel according to any one of the aforementioned embodiments. The display panel of the present disclosure may be applied to a display apparatus with a pixel drive circuit and a sense compensation circuit, such as an OLED, a quantum dot display (QLED), a light emitting diode display (Micro LED or Mini LED), or a Quantum Dot Light Emitting Diode display (QDLED), which is not limited here in the present disclosure.

The display apparatus of the embodiment of the present disclosure detects whether the dynamic and static attributes of the picture displayed in the previous preset time period change during a display process; if the dynamic and static attributes do not change, real time sense compensation is performed; otherwise, does not compensate the picture displayed in a next preset time period according to the sense result of the sense compensation circuit in the previous preset time period; and/or, turns off the sense function of the sense compensation circuit in the next preset time period to maintain the accuracy of the real time sense compensation data, which can effectively shield the phenomenon that the lateral textures appear in the compensated picture displayed caused by the change of the dynamic and static attributes of the picture and improve the display effect.

Although implementation modes disclosed in the present disclosure are described as above, the described contents are only implementation modes which are used for facilitating understanding of the present disclosure, but are not intended to limit the present invention. Any skilled person in the art to which the present disclosure pertains may make any modification and variation in a form and details of implementation without departing from the spirit and scope of the present disclosure. However, the patent protection scope of the present invention should be subject to the scope defined in the appended claims.

The invention claimed is:

1. A display panel, comprising a plurality of pixel units and a sense compensation circuit, wherein at least one pixel unit comprises a plurality of sub-pixels, and at least one sub-pixel comprises a pixel drive circuit and an element to be driven, the display panel further comprises: a detection unit and a compensator;

- the pixel drive circuit is configured to drive the element to be driven to emit light in an active time;
- the sense compensation circuit is configured to sense electrical characteristics of the element to be driven in a non-active time;
- the detection unit is configured to detect whether dynamic and static attributes of a picture displayed by the display panel in a previous preset time period change, wherein the preset time period comprises the active time and the non-active time, and when the dynamic and static attributes of the picture displayed by the display panel in the previous preset time period change, send a first notification to the compensator;

the compensator is configured to receive the first notification and perform at least one of following operations: not compensating a picture displayed in a next preset time period according to a sense result of the sense compensation circuit in the previous preset time period, and turning off a sense function of the sense compensation circuit in the next preset time period.

2. The display panel according to claim 1, wherein the detection unit detecting whether the dynamic and static attributes of the picture displayed by the display panel in the previous preset time period change comprises:

when a picture displayed in a preset time period before the previous preset time period is a dynamic picture, detecting whether the picture displayed in the previous preset time period is a static picture relative to a first picture, and when the picture displayed in the previous preset time period is the static picture relative to the first picture, determining that the dynamic and static attributes of the picture displayed in the previous preset time period change; when one or more frames of the picture displayed in the previous preset time period are dynamic pictures relative to the first picture, determining that the dynamic and static attributes of the picture displayed in the previous preset time period do not change, wherein the first picture is a picture in a x-th frame before each frame or a preset reference picture, and x is a natural number greater than or equal to 1;

when the picture displayed in the preset time period before the previous preset time period is the static picture, detecting whether the picture displayed in the previous preset time period is the dynamic picture relative to the first picture, and when the picture displayed in the previous preset time period is the dynamic picture relative to the first picture, determining that the dynamic and static attributes of the picture displayed in the previous preset time period change; when one or more frames of the picture displayed in the previous preset time period are static pictures relative to the first picture, determining that the dynamic and static attributes of the picture displayed in the previous preset time period do not change.

3. The display panel according to claim 2, wherein a length of the preset time period is related to a refresh rate of the display panel, and the higher the refresh rate of the display panel, the longer the length of the preset time period.

4. The display panel according to claim 2, wherein the preset time period comprises a $\Delta t1$ time interval and a $\Delta t2$ time interval;

when the picture displayed in the preset time period before the previous preset time period is the dynamic picture, the previous preset time period is the $\Delta t1$ time interval; when the picture displayed in the preset time period before the previous preset time period is the static picture, the previous preset time period is the $\Delta t2$ time interval.

5. The display panel according to claim 4, wherein the $\Delta t1$ time interval is longer than the $\Delta t2$ time interval.

6. The display panel according to claim 1, wherein the compensator is configured to perform any of following operation:

when the first notification is received, not turning off the sense function of the sense compensation circuit in the next preset time period, and not compensating the picture displayed in the next preset time period;

when the first notification is received, not turning off the sense function of the sense compensation circuit in the next preset time period, and compensating the picture displayed in the next preset time period according to a sense result of the sense compensation circuit in a time other than the previous preset time period;

when the first notification is received, turning off the sense function of the sense compensation circuit in the next preset time period, and not compensating the picture displayed in the next preset time period;

when the first notification is received, turning off the sense function of the sense compensation circuit in the next preset time period, and compensating the picture displayed in the next preset time period according to the sense result of the sense compensation circuit in the time other than the previous preset time period.

7. The display panel according to claim 1, wherein the time other than the previous preset time period comprises at least one of following: a startup time, a shutdown time, a user-specified time, a blank time outside the previous preset time period.

8. The display panel according to claim 1, wherein the compensator is further configured to perform a following operation: when the first notification is not received, compensating the picture displayed in the next preset time period according to the sense result of the sense compensation circuit in the previous preset time period.

9. The display panel according to claim 1, wherein the detection unit determines the static and dynamic attributes of picture in each frame according to whether a change amount of brightness of picture in each frame relative to brightness of a first picture is greater than a preset change amount threshold, and the first picture is a picture in a x-th frame before the picture in each frame or a preset reference picture, and x is a natural number greater than or equal to 1.

10. The display panel according to claim 9, wherein the brightness of picture in each frame comprises brightness of various sub-pixels and brightness of a whole picture, and the preset change amount threshold comprises change amount thresholds of various sub-pixels and a change amount threshold of the whole picture.

11. A display apparatus, comprising the display panel according to claim 1.

12. A display method of a display panel, wherein the display panel comprises a plurality of pixel units and a sense compensation circuit, and at least one pixel unit comprises a plurality of sub-pixels, and at least one sub-pixel comprises a pixel drive circuit and an element to be driven, the display panel further comprises: a detection unit and a compensator, the display method comprises:

detecting, by the detection unit, whether dynamic and static attributes of a picture displayed by the display panel in a previous preset time period change, wherein the preset time period comprises an active time and a non-active time, and when the dynamic and static attributes of the picture displayed by the display panel in the previous preset time period change, sending a first notification to the compensator;

when the compensator receives the first notification, the compensator performing at least one of following operations: not compensating a picture displayed in a next preset time period according to a sense result of the sense compensation circuit in the previous preset time period, and turning off a sense function of the sense compensation circuit in the next preset time period.

13. The display method according to claim 12, wherein the detection unit detecting whether the dynamic and static attributes of the picture displayed by the display panel in the previous preset time period change comprises:

when a picture displayed in a preset time period before the previous preset time period is a dynamic picture, detecting, by the detection unit, whether the picture displayed in the previous preset time period is a static picture relative to a first picture, and when the picture displayed in the previous preset time period is the static picture relative to the first picture, determining, by the detection unit, that the dynamic and static attributes of the picture displayed in the previous preset time period change; when one or more frames of the picture displayed in the previous preset time period are dynamic pictures relative to the first picture, determining, by the detection unit, that the dynamic and static attributes of the picture displayed in the previous preset time period do not change, wherein the first picture is a picture in a x-th frame before each frame or a preset reference picture, and x is a natural number greater than or equal to 1;

when the picture displayed in the preset time period before the previous preset time period is the static picture, detecting, by the detection unit, whether the picture displayed in the previous preset time period is the dynamic picture relative to the first picture, and when the picture displayed in the previous preset time period is the dynamic picture relative to the first picture, determining, by the detection unit, that the dynamic and static attributes of the picture displayed in the previous preset time period change; when one or more frames of the picture displayed in the previous preset time period are the static pictures relative to the first picture, determining, by the detection unit, that the dynamic and static attributes of the picture displayed in the previous preset time period do not change.

14. The display method according to claim 13, wherein the preset time period comprises a Δt1 time interval and a Δt2 time interval;

when the picture displayed in the preset time period before the previous preset time period is the dynamic picture, the previous preset time period is the Δt1 time interval; when the picture displayed in the preset time period before the previous preset time period is the static picture, the previous preset time period is the Δt2 time interval.

15. The display method according to claim 14, wherein the Δt1 time interval is longer than the Δt2 time interval.

* * * * *